(12) United States Patent
Cok (10) Patent No.: US 7,271,780 B2
(45) Date of Patent: Sep. 18, 2007

(54) DISPLAY DEVICE AND SYSTEM

(75) Inventor: Ronald S. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 558 days.

(21) Appl. No.: 10/668,730

(22) Filed: Sep. 23, 2003

(65) Prior Publication Data
US 2005/0062695 A1    Mar. 24, 2005

(51) Int. Cl.
G09G 5/00    (2006.01)

(52) U.S. Cl. .................. 345/1.1; 345/3.1; 345/3.3; 345/3.4

(58) Field of Classification Search ............. 345/1.1, 345/30, 530, 668, 690, 87.88, 3.4, 625–637, 345/3.1, 3.3, 810; 715/716; 382/209, 254; 348/407, 416, 333.11, 231.1; 725/55; 386/68; 705/51; 700/29; 375/240.1; 703/11
See application file for complete search history.

(56) References Cited

U.S. PATENT DOCUMENTS

| | | | |
|---|---|---|---|
| 2,361,563 A | | 10/1944 | Pellaton |
| 4,833,625 A | * | 5/1989 | Fisher et al. ............... 345/668 |
| 5,043,955 A | | 8/1991 | Dubois et al. |
| D327,443 S | | 6/1992 | Sugita et al. |
| D327,656 S | | 7/1992 | Sugita et al. |
| 5,231,501 A | | 7/1993 | Sakai |
| 5,440,401 A | | 8/1995 | Parulski et al. |
| 5,534,921 A | | 7/1996 | Sawanobori |
| 5,600,373 A | * | 2/1997 | Chui et al. ............... 375/240.1 |
| 5,648,816 A | | 7/1997 | Wakui |
| 5,774,599 A | * | 6/1998 | Muka et al. ............... 382/254 |
| 5,900,608 A | | 5/1999 | Iida |
| 5,901,246 A | * | 5/1999 | Hoffberg et al. ............ 382/209 |
| 5,931,679 A | | 8/1999 | Funahashi |
| 6,209,787 B1 | | 4/2001 | Iida |
| 6,337,712 B1 | | 1/2002 | Shiota et al. |
| D465,739 S | | 11/2002 | Arabov |

(Continued)

FOREIGN PATENT DOCUMENTS

EP    1 241 838 A2    9/2002

(Continued)

OTHER PUBLICATIONS

New! I Want My PVP, Handheld Computing Issue 6.3.

(Continued)

Primary Examiner—Bipin Shalwala
Assistant Examiner—Prabodh Dharia (57) ABSTRACT

A display device, system, and method are provided. The display device has a communication interface adapted to communicate with an archival storage device, a content source adapted to acquire content in an acquisition form, a presentation system for presenting content in a form that is different from the acquisition form and a memory for storing content. A controller is provided and is adapted to receive acquired content from the content source, to form presentation content that corresponds to the acquired content said presentation content adapted for presentation using the presentation system and to cause the acquired image content and the corresponding presentation content to be stored in the memory. The controller is further adapted to cause the communication interface to transfer acquired content to the archival storage device and to delete the transferred acquired content from the memory.

17 Claims, 5 Drawing Sheets

U.S. PATENT DOCUMENTS

| | | |
|---|---|---|
| 6,509,901 B1 | 1/2003 | Agarwal et al. |
| 6,549,214 B1* | 4/2003 | Patel et al. ............... 345/660 |
| 6,771,278 B2* | 8/2004 | Shigeta .................. 345/634 |
| 6,850,252 B1* | 2/2005 | Hoffberg ................. 715/716 |
| 6,930,718 B2* | 8/2005 | Parulski et al. ........ 348/333.11 |
| 7,116,361 B2* | 10/2006 | Baron ................... 348/231.1 |
| 2001/0013131 A1 | 8/2001 | Wang |
| 2001/0017656 A1 | 8/2001 | Araki et al. |
| 2002/0010679 A1* | 1/2002 | Felsher .................... 705/51 |
| 2002/0021359 A1 | 2/2002 | Okamoto |
| 2002/0075392 A1 | 6/2002 | Imaeda |
| 2002/0087546 A1 | 7/2002 | Slater et al. |
| 2002/0092021 A1* | 7/2002 | Yap et al. ................ 725/55 |
| 2002/0094119 A1* | 7/2002 | Sahadevan ............... 382/132 |
| 2002/0149695 A1 | 10/2002 | Kayanuma |
| 2002/0180803 A1* | 12/2002 | Kaplan et al. ............. 345/810 |
| 2002/0184180 A1 | 12/2002 | Debique et al. |
| 2003/0063196 A1 | 4/2003 | Palatov et al. |
| 2003/0229900 A1* | 12/2003 | Reisman ................... 725/87 |
| 2004/0021669 A1* | 2/2004 | Fredlund et al. ........... 345/530 |
| 2004/0031058 A1* | 2/2004 | Reisman .................. 725/112 |
| 2004/0145602 A1* | 7/2004 | Sun et al. ................ 345/720 |
| 2004/0170383 A1* | 9/2004 | Mazur ..................... 386/68 |
| 2004/0204775 A1* | 10/2004 | Keyes et al. .............. 700/29 |
| 2004/0257380 A1* | 12/2004 | Herbert et al. ............ 345/619 |
| 2005/0004880 A1* | 1/2005 | Musgrove et al. .......... 705/400 |
| 2005/0035981 A1* | 2/2005 | Ozaki .................... 345/690 |
| 2005/0134719 A1* | 6/2005 | Beck .................... 348/333.11 |
| 2005/0246469 A1* | 11/2005 | Chu ..................... 710/301 |
| 2005/0264472 A1* | 12/2005 | Rast ...................... 345/30 |
| 2005/0273305 A1* | 12/2005 | Thalhammer-Reyero ..... 703/11 |
| 2007/0011713 A1* | 1/2007 | Abramson et al. .......... 725/113 |

FOREIGN PATENT DOCUMENTS

| | | |
|---|---|---|
| WO | WO99/21186 | 4/1999 |

OTHER PUBLICATIONS

Reviews, Palm Zire 71, Handheld Computing, Issue 6.3.
Reviews, Archos AV120 Video Recordeer, Handheld Computing, Issue 6.3.
Kinoma, http://www.kinoma.com.
http://www.palmone.com/us/solutions/personal/kinoma.
Firepad, http://www.firepad.com/product/fireconverter, Sep. 18, 2003.
Fireviewer, hppt://www.firepad.com/products/fireviewer/, Sep. 19, 2003.
eFilm PicturePad, Delkin Devices, www/delkin.com.
Computer Link Magazine, Feb. 2003, ViewSonic Announces New Portable Video Play at CES, www.viewsonic.com.

* cited by examiner

DISPLAY DEVICE AND SYSTEM

FIELD OF THE INVENTION

The present invention relates to portable digital image content display systems having local storage and playback and, more specifically, to methods for managing digital image content stored in the portable display system.

BACKGROUND OF THE INVENTION

Portable display systems are frequently used to display digital image content such as still images, image sequences, streams of image content and/or text and graphics. Often, such systems are also capable of generating audible signals based upon audio content such as audio content that is associated with the image content. For example, Digital Versatile Disk (DVD) players are known that are capable of reading data from an optical disc containing image content and associated audio and converting this image content and audio data into human viewable and audible form. These systems are typically used in conjunction with commercially produced optical disks such as feature length motion pictures and audio disks. Advanced computer users and the owners of currently expensive home electronic optical disk recorders also can create optical disks having personally selected image content and audio collections. However, such optical discs are often time consuming for home users to produce and edit, for example, to include new content. Accordingly, even when home users produce optical disks having personal content stored thereon, the personal content often quickly becomes outdated. What is needed therefore is a portable video player that is capable of receiving personal image and audio content and updating this content in a simple and efficient manner.

Thus, portable systems having rewritable semi-conductor memory, and so-called hard disks, are therefore preferred for use in portable digital display devices. However, the high cost of such types of rewriteable memory has traditionally prohibited the use of such memory in a portable display device. Recently however, there has been a rapid increase in storage sizes and a concomitant reduction in the cost of various forms of rewritable memory. Accordingly, an increasing number of portable display systems have been developed that are capable of carrying very large collections of image and/or audio content. A user typically exchanges image content and/or audio content with the rewriteable memory in such portable display systems using a computer system such as a personal computer. In this way, the personal computer can be used to provide user interface capabilities, processing power, customized automatic data transfer software, archival storage and communication capabilities to facilitate the process of exchanging image content and/or audio content with the rewritable memory in the digital display device. This makes the use of such devices significantly more attractive to consumers and a variety of products of this type are currently known.

Examples of commercially available portable display systems include the Archos AV320 handheld entertainment center sold by Archos, Inc., Irvine, Calif., USA, the eFilm PicturePAD™ sold by Delkin Devices, Inc. Poway, Calif., USA and the ViewSonic Personal Video Player, sold by ViewSonic Corporation, Walnut, Calif., USA and the Sharp-AV 300 sold by Sharp Electronics Corporation Romeoville, Ill. U.S.A. Each of these players contain rewriteable memories that are large enough to store collections of image and audio content. These devices obtain content that has been captured and converted into digital form and selected units can obtain content by way of capture. For example, the AV300 has a docking station that enables audio and video signals to be input into the AV300 which records these signals.

Further, such high capacity rewriteable memories are being incorporated into products such as personal digital assistants, digital cameras, and portable telephones and other devices that have video displays, enabling such devices to be used to store and present collections of image content. Examples of portable video players of this type include a personal digital assistant, the Palm Zire 71 sold by Palm Inc., Milpitas, Calif., USA which is capable of presenting video content using, for example, software known as Fire-Viewer™ sold by Firepad Inc, Costa Mesa, Calif., USA. Other personal digital assistants use programs such as Windows media player, provided by Microsoft Corporation, Redmond, Wash., USA, Shockwave, QuickTime media player provided by Apple Computer, Cupertino, Calif., USA, FlashPlayer provided by Macromedia Inc., San Francisco, Calif., USA and/or players compatible with the standards set forth by the Moving Pictures Export Group such as such as MPEG-1, MPEG-2 or later versions of the MPEG standard to present image content and/or audio content stored therein.

High capacity rewriteable memories that are capable of storing and sharing image content and/or audio content but that do not incorporate displays. Examples of this type of device include the Digital Wallet sold by Minds@work LLC, Irvine, Calif. USA, the EZ Digimagic DM220 portable CD-RW drive sold by and the Buslink Photo Bank sold by Buslink Inc. These devices typically function to provide a large portable memory that can store data captured by digital cameras and the like without using a personal computer.

Despite the recent increase in the memory capacity of rewritable memories, the demands placed upon such rewritable memories continues to outstrip the available capacity. In particular, the use of image sequences and streaming image information rather than still images greatly increases the capacity requirements for rewritable memory in display and/or storage device. Further, the desire of many users to store significant collections of audio content also greatly increases the requirements for rewritable memory capacity. Thus, while the rewritable memory capacity available in a portable display device has increased greatly, consumers can find that they cannot always store as much content in such memory as they would like. Moreover many consumers are concerned that portable display and/or storage devices that incorporate such rewritable memory are too vulnerable to loss or destruction to serve as a consumer's only storage means for personal imagery. Thus, consumers often use devices such as the portable video display devices to store a limited collection of image and audio content and also use a personal computer to store an archival collection containing a complete collection of their content.

While the personal computer provides a uniquely valuable way to store the image and audio content, such an arrangement requires a meaningful amount of oversight and active data management. For the personal computer to act as an archive for the image and audio content stored on the rewritable memory of a portable display device it is necessary to maintain both a collection of image content and/or audio content on the portable display device and the collection of image content and/or audio content on the personal computer.

The management of file transfers between rewritable memory in a portable display device can be controlled manually as is described in Publication No. US 2003/0063196 A1 entitled "Handheld Portable Interactive Data Storage Device" filed on May 8, 2000. The '196 publication describes a portable interactive data storage device that includes a disk drive, a microprocessor, a USB port, and a data storage card slot. The device also includes a small liquid crystal matrix display and a small number of user controls. The device of the '196 publication is configured for data storage, rather than as a small general purpose computer, and preferably does not include a keyboard. This device is capable of receiving digital image content and/or audio content not only from a personal computer but also from other sources of data such as memory cards provided by other devices. In this regard, the data storage card slot is configured to accept small data storage cards, such as flash memory PC cards or CompactFlash cards through a PC card adapter. The disk drive has a substantially larger capacity than the data storage cards. For example, using the storage a user loads data onto a data storage card using a portable electronic device, such as a digital camera. The user then inserts the card into the storage device and uploads the data to the disk drive. The card can then be repeatedly reused in the digital camera by uploading the data to the storage device after each use.

Eventually, the user returns to a computer and connects the storage device to the computer through the USB port and uploads the accumulated data such as digital image content and/or digital audio in MP3 form to the computer. The device acts as a conventional disk drive and is managed by the user of the computer in this manner with data being transferred between the device and the computer as the user would transfer the data between two drives on the personal computer. This method of transfer, however, requires user involvement at all stages in the data transfer which can be tedious and challenging for some users.

Typically this challenge has been addressed in the art using synchronization software located on the personal computer. The synchronization software builds a database on the personal computer that is a virtual copy of the database in the memory of the portable device. That is, a generally exact copy of the data stored in the display device is also stored on the personal computer. Thus, to alter what is stored on the display device it is necessary to manually make changes to the database in the personal computer. What is needed is a more automated way to manage such databases.

This need is particularly acute when a user wishes to effectively extend the amount of content that can be stored on the portable device by modifying image and/or audio content so that content is stored on the rewritable memory of the portable display device in a manner that reduces the amount of memory that is required to store this content. Typically, such modifications are made in a manner that is intended to reduce the amount of storage capacity used to store the information without reducing the apparent quality of the content as presented by the portable display device. For example, when a user of the FireViewer software wishes to store image content on a Palm Zire 71 for presentation using the FireVewer software, the user will process the content using software known as Fire Converter also provided by FirePad, Inc. This software converts images and image content into a form that is adapted for presentation using the display system incorporated in the Palm Zire 71. Because this Palm Zire 71 has a display having an imaging resolution that is significantly smaller than the imaging resolution typically found in digital images and/or sequences of images and/or streams of image information, the Fire-Converter software can process image content to form a lower resolution version of this content that can be stored on the Palm Zire 71 in rewritable memory. This lower resolution version uses less rewritable memory than would be used had the original image content been directly downloaded to the Palm Zire 71. In this way, the data storage requirements associated with image content can be effectively reduced when such content is stored in the portable device.

However, when using existing software, the archival image content must be manually converted, manually identified for download to the portable display device, and manually organized for viewing on the hand held device. Further, to the extent that the archival image content converted by the FireConverter was conveyed to the computer using the Palm Zire 71, it is likely that the user of the Palm Zire 71 will want to replace the archival image content data with the converted image content. The removal of the archival image content is also performed manually.

Thus what is needed is a more automated method for accessing, exchanging and processing image content and audio content data that permits a user to use a portable display device to store a large collection of image content and/or audio content on a portable display device in a manner that conserves available memory in the display device. A further need is for independent data archiving and a more automated method for extracting acquired image content from a display device, processing this acquired content for use by the display device and conveying the acquired content to the display device in a useful manner. What is also needed is a method for managing acquired content that more fully automates the storage, presentation, organization and format of acquired content stored on the display device.

SUMMARY OF THE INVENTION

In one aspect of the invention, a digital display device is provided. The display device has a communication interface adapted to communicate with an archival storage device, a content source adapted to acquire content in an acquisition form, a presentation system for presenting content in a form that is different from the acquisition form and a memory for storing content. A controller is provided and is adapted to receive acquired content from the content source to form presentation content that corresponds to the acquired content said presentation content adapted for presentation using the presentation system and to cause the acquired image content and the corresponding presentation content to be stored in the memory. The controller is further adapted to cause the communication interface to transfer acquired content to the archival storage device and to delete the transferred acquired content from the memory.

In another aspect of the invention what is provided is a digital imaging system. The digital imaging system comprises a display device having a source of image content adapted to acquire image content in an acquisition form, a controller to temporarily store the image content in the acquisition form in a display device memory, a display for presenting image content, and a communication interface adapted to exchange the acquired image content with an archival storage device. The archival storage device has a processor that is adapted to automatically input the image content from the display device, to store the acquired image content in an archival memory, and to automatically signal the display device when the acquired image content is stored in the archival memory. Where the acquired image content is converted into presentation content that is in a form that is different from the acquisition form, the presentation content is stored in the display device memory, and the display device is adapted to automatically receive the signal from the archival storage device and to delete the acquired image content from the display device memory in response to the signal.

In still another aspect of the invention, a method is provided for operating a display system having a display and a memory. In accordance with this method, image content is acquired having an acquisition form and the image content is stored in the memory. The acquired image content is processed to form presentation image content having form adapted for presentation on the display. The presentation image content is stored in the memory. The acquired image content is transferred to an archival storage device; and the acquired image content is deleted from the memory.

DETAILED DESCRIPTION OF THE INVENTION

Figure 1:
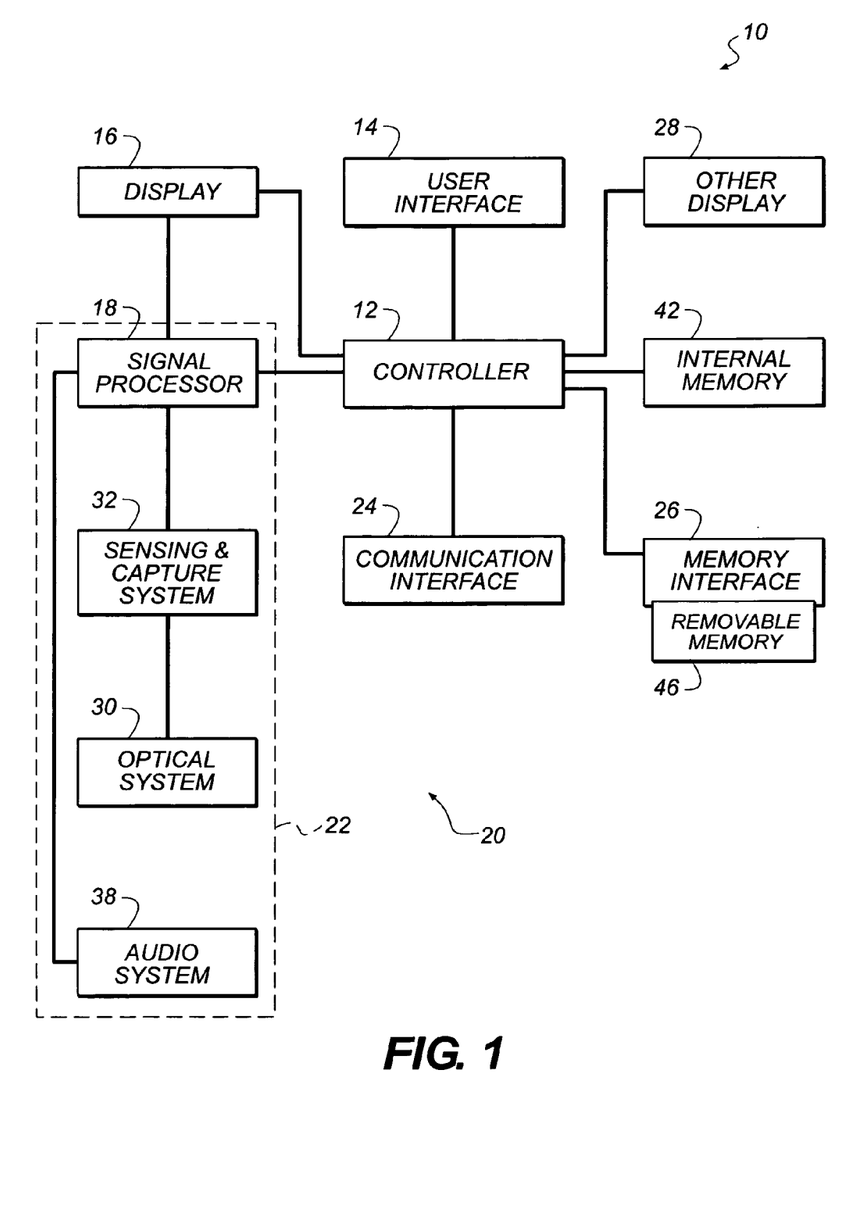
FIG. 1 is a block diagram of a display device according to the present invention.

FIG. 1 shows one embodiment of a digital display device 10 in accordance with the present invention. As is shown in FIG. 1, digital display device 10 comprises a controller 12, user interface 14, display 16, signal processor 18, source of content 20, an image capture system 22, a communication interface 24, a memory interface 26 and an internal memory 42. Controller 12 controls the operation of display device 10. Controller 12 can comprise a microprocessor such as a programmable general purpose microprocessor, a dedicated micro-processor or micro-controller, or any other system that can be used to control operation of display device 10.

Controller 12 cooperates with user interface 14 to allow display device 10 to interact with a user. User interface 14 can comprise any form of transducer or other device capable of receiving an input from a user and converting this input into a form that can be used by controller 12 in operating display device 10. For example, user interface 14 can comprise a touch screen input, a touch pad input, a 4-way switch, a 6-way switch, an 8-way switch, a stylus system, a trackball system, a joystick system, a voice recognition system, a gesture recognition system, affective sensing system, or other such systems.

Controller 12 also cooperates with display 16 to cause display 16 to present image content such as still images, sequences of still images, streams of image information text, symbols and graphics. Display 16 can comprise, for example, a color liquid crystal display (LCD), organic light emitting display (OLED) also known as an organic electroluminescent display (OELD) or other type of video display. Display 16 can be fixed to display device 10. Display 16 can also be separable from or separate from display device 10. In embodiments where display 14 is separable from or separate from display device 10, display device 10 and display 16 will each incorporate communication modules (not shown) capable of exchanging information that will allow controller 12 to control what is displayed on display 16. In other alternative embodiments, display device 10 can have more than one display 16. In the embodiment of FIG. 1, a signal processor 18 is shown. In certain embodiments, controller 12 can use signal processor 18 to cause or to help cause images to be formed and presented on display 16. In this regard signal processor 18 can provide display driver functions.

Display device 10 can also have other displays 28 such as a segmented LCD or LED display, an LED or other visible display device which can also permit controller 12 to provide information to a user. This capability is used for a variety of purposes such as establishing modes of operation, indicating control settings, user preferences, and providing warnings and instructions to a user of display device 10. Other systems such as known systems and actuators for generating audio signals, vibrations, haptic feedback and other forms of signals can also be incorporated into display device 10 for use in providing information, feedback and warnings to the user of display device 10. Using display 16 and/or other displays 28, display device 10 can present image content as well as information such as the status and mode of operation of display device 10.

Image content and/or audio content is supplied to display device 10 by way of a source of content 20. In the embodiment shown in FIG. 1, source of content 20 includes three different systems, an image capture system 22, a communication interface 24 and a memory interface 26. Image capture system 22 comprises lens system 30 and an image sensing system 32. In operation, light from a scene is focused by lens system 30 and forms an image at image sensing system 32. Lens system 30 can have one or more elements, be of a fixed focus type or can be manually or automatically adjustable. Lens system 30 is optionally adjustable to provide a variable zoom that can be varied manually or automatically. Other known arrangements can be used for lens system 30.

Image sensing system 32 converts light that is focused onto lens system 30 into image signals representing an image of the scene. Image sensing system 32 can use for example an image sensor (not shown) having a charge couple device (CCD), a complementary metal oxide sensor (CMOS), or any other electronic image sensor known to those of ordinary skill in the art.

Signal processor 18 receives the image signals from image sensing system 32 and processes these image signals to form image content. The image content can comprise one or more still images, multiple still images and/or a stream of apparently moving images such as a video segment. Where image content comprises a stream of apparently moving images, the image content can comprise image data stored in an interleaved or interlaced image form, a sequence of still images, and/or other forms known to those of skill in the art of digital video.

Signal processor 18 can apply various image processing algorithms to the image signals when forming an image content. These algorithms can include, but are not limited to, color and exposure balancing, interpolation and compression. Where the image signal is in the form of an analog signal, signal processor 18 can also convert the analog signals into a digital form.

An audio system 38 is provided. Audio system 38 includes a microphone (not shown) and conventional amplification and analog to digital conversion circuits known for converting audible sounds into digital signals. Digital audio signals captured by audio system 38 are provided to signal processor 18. Signal processor 18 converts these audio signals into audio content in digital form. Where the audio content is captured in association with the image content, signal processor 18 automatically associates the image and audio content in a common digital file integrated with the image content. Audio system 38 also includes a speaker system and/or an audio output port to which a speaker or amplifier system can be joined for reproducing captured audio inputs and for reproducing, in audio form, audio signals acquired or generated in other ways.

Source of content 20 can also provide image content and/or audio content that are captured by other devices and transferred to display device 10. For example, source of content 20 can comprise a communication module such as communication interface 24 shown in FIG. 1 for communicating with a remote memory system (not shown). Communication interface 24 can be an optical, radio frequency or other transducer that converts image and other data into a form that can be conveyed to display device 10 by way of an optical signal, radio frequency signal or other form of signal. Examples of communication interface 24 include, but are not limited to, a cellular telephone transceiver, an 802.11 interface, a so called Blue Tooth transceiver, and an Infrared communication transceiver. Communication interface 24 can also be used to acquire a digital image and other information from a host computer or network (not shown). Communication interface 24 can also optionally be adapted to acquire image and/or audio content from sources such as conventional radio and television signals and from digital radio and television signals. Communication interface 24 can receive such content wirelessly or using circuit connections such as audio video cables containing image and/or audio content.

Communication interface 24 can also receive signals containing information and instructions for execution by controller 12 including but not limited to, signals from a remote control device (not shown) such as a remote trigger button (not shown) and can operate display device 10 in accordance with such signals.

Similarly, content that is captured or otherwise provided by another device can be stored on a removable memory 46 with removable memory 46 being operatively joined to memory interface 26. Memory interface 26 can comprise a port controlled by controller 12 to access digital imagery, either through a storage device such as a Compact Flash card, or through an interface connection such as a Universal Serial Bus (USB) connection. Controller 12 and memory interface 26 are operable using techniques known in the art to extract image content and/or audio content from a removable card.

It will be appreciated that, in the embodiment of FIG. 1, source of content 20 is shown having an image capture system 22, a communication interface 24 and a memory interface 26 for acquiring content. Such an embodiment can comprise, for example, a digital camera or personal digital assistant having an image capture system such as the Palm Zire 71. In other embodiments, source of content 20 can comprise these sources of content or combinations of more than one. For example, display device 10 can have a source of content 20 having only a communication interface 24 for obtaining content. Examples of such a device include, but are not limited to, a personal digital assistant, a cellular telephone, and a portable display system. Alternatively, in another example, display device 10 can have source of content 20 having a communication interface 24 and a memory interface 26.

Image content and/or audio content that is obtained from source of content 20 is then stored in internal memory 42. Internal memory 42 and removable memory card 46 can consist of any of a number of rewritable memories, for example, a solid-state memory, Compact Flash-Cards, or a non-solid-state memory, for example a miniature disk drive or an optical drive.

Image content and/or audio content can be stored in a compressed form. For example where the digital image comprises a sequence of still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Similarly, other compression systems such as the MPEG-4 (Motion Pictures Export Group) or Apple QuickTime™ standard can be used to store digital image data in a video form. Other image compression and storage forms can be used.

Figure 2:
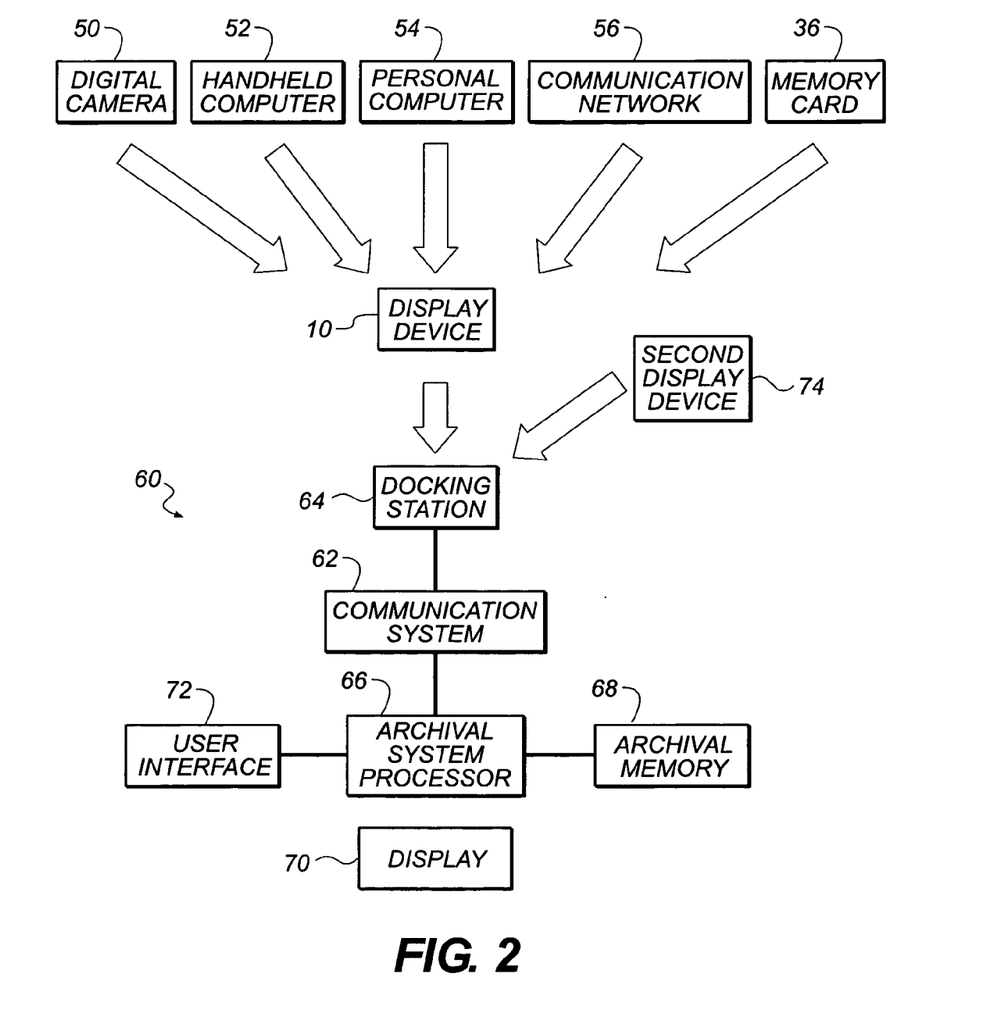
FIG. 2 is a block diagram of a digital image acquisition, storage, and display system according to the present invention.

FIG. 2 shows one embodiment of an imaging system 48 of the present invention. As is shown in FIGS. 1 and 2, display device 10 can obtain image content using image capture system 22, communication interface 24, and/or memory interface 26 to acquire images by way of capture and by way of communication with other sources of image content including, but not limited to, memory card 46, digital camera 50, handheld portable computer 52, or personal computer 54, or communication network 56. As noted above, internal memory 42 has a limited capacity for storing image and/or audio content. Accordingly, display device 10 is associated with an archival storage device 60 that can receive image and/or audio content from display device 10, and store this content.

In the embodiment shown in FIG. 2, archival storage device 60 comprises a communication system 62, an archival system processor 66, an optional docking station 64, an archival storage memory 68, an optional display 70 and user interface 72. One example of such an archival storage device 60 can be a conventional home computer running complementary software to interact with display system 10.

Alternatively, archival storage device 60 can be an online computer server programmed to interact with display device 10. Archival storage device 60 can take other useful forms. Archival storage device 60 has a communication system 62.

Archival storage device 60 uses communication system 62 for communicating with display device 10. Communication system 62 can be adapted to communicate with display device 10 in a variety of ways. For example, communication system 62 can comprise an interface that permits a direct electrical, magnetic and/or optical connection to be made between communication interface 24 of display device 10 and communication system 62 of archival storage device 60. One example of such a direct electrical connection is the Universal Serial Bus interface that is connected to display device 10. In the embodiment shown in FIGS. 1 and 2, this occurs when display device 10 is inserted into an optional docking station 64 to which archival storage device 60 is connected. Docking station 64 provides a communication link between display device 10 and archival storage device 60 and can optionally provide additional functionality such as additional user interfaces, printing and/or automatic archiving of image and/or audio content transferred from display device 10 to archival storage device 60 by way of docking station 64.

Display device 10 and archival storage device 60 can establish a communication link using other conventional communication systems such as radio frequency or other electromagnetic or electro-optical wireless communication systems. A communication link between display device 10 and archival storage device 60 can also be established using a telecommunications network such as the internet.

After a communication link is established between display device 10 and archival storage device 60, acquired content is copied from display device 10 to archival storage device 60 and stored in archival storage memory 68. Archival system processor 66 automatically instructs communication system 62 to send a signal to display device 10 when acquired content is successfully stored. Display device 10 receives this signal and ceases transfer of image and/or audio content. In this way, image and audio content can be acquired by display device 10 and stored in an archival fashion for later use.

Communication system 62 can also optionally be adapted to acquire image and/or audio content form sources other than display device 10. For example, communication system 62 and/or archival system processor 66 can be adapted to communicate with other devices and to acquire content therefrom. In this regard, communication system 62 can be adapted to communicate directly with devices such as digital camera 50, handheld computer 52, personal computer 54, communication network 56 and/or a memory device such as memory card 46 which can provide image and/or audio content to archival storage device 60. Archival storage device 60 optionally provides a display 70 and user interface 72 to permit a user to manually view and/or modify image and/or audio content stored within archival storage memory 68 for example by editing the image content, organizing the content into collections, deleting, and/or renaming content files.

Figure 3:
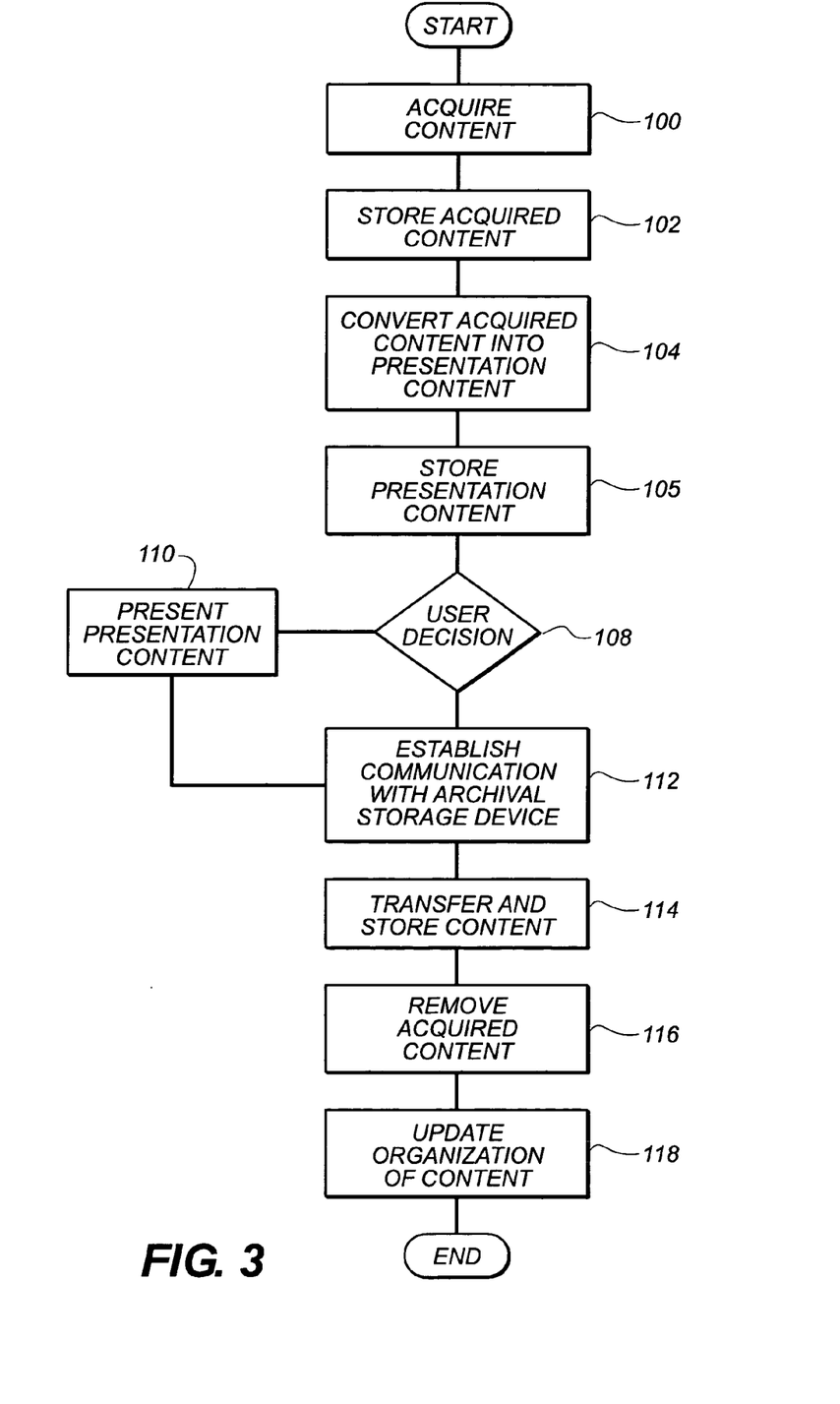
FIG. 3 is a flow diagram showing a method for operating a digital image acquisition, storage, and display system according to the present invention.

FIG. 3 shows a block diagram illustrating one embodiment of a method for processing image and/or audio content. In accordance with this embodiment, image content is acquired by display device 10 (step 100). This can be done in any of the manners described above. For example, where a user of display device 10 takes display device 10 to a family reunion, images that are captured by other family members using other digital cameras, can be transferred to display device 10 by storing such images on memory card 46 and functionally associating memory card 46 with memory interface 44. When controller 12 of display device 10 determines that such a functional association has been made, controller 12 causes a copy of the acquired image content and/or audio content stored on memory card 46 to be stored in internal memory 42 (step 102). User interface 14 can be used to selectively acquire specific image content stored in memory card 46, alternatively, all content stored in memory card 46 can be transferred to memory 42. Signal processor 18 can be used in this process to convert image content files into a preferred form for storage in internal memory 42.

It will be appreciated that the image forming capabilities of existing displays are currently substantially lower than the image capturing resolution of existing image sensing systems. Accordingly, image content that is acquired by way of capture typically has more information than can be used in presenting this content on display 16. This extra information increases the amount of memory capacity required to store the image content without any concomitant benefit to the observer of the content. Further, acquired image content having extra information must be processed when it is to be presented, this increases the processing burdens placed upon controller 12 and signal processor 18 when a user of display device 10 causes acquired image content to be presented on display 16. This additional processing also increases the amount of delay between the time at which the user of display device 10 uses user interface 14 to indicate that content is to be presented and the time at which display device 10 actually presents the content.

Thus, in the embodiment shown in FIGS. 1 and 2, controller 12 and/or signal processor 18 are adapted to convert such image content into a presentation form (step 104). For example, down sampling and other conventional techniques for reducing the overall imaging resolution can be used to form a presentation image content that is adapted for presentation on display 16. Resampling techniques such as are described in commonly assigned U.S. Pat. No. 5,164,831 "Electronic Still Camera Providing Multi-Format Storage Of Full And Reduced Resolution Images" filed by Kuchta et al., on Mar. 15, 1990, can be used. For example, where display 16 has a predetermined display resolution, acquired image content can be converted into presentation image content that has a resolution that is at least 51 percent of the display resolution. In this way, presentation image content can be formed that has a relatively large size suitable for viewing on display 16. Other image content and/or audio content modifications can also be applied at this point to reduce the overall file size of data files containing presentation content. These include adjustments in color gamma, the number of colors in each image, the amount of compression used to package the content, the number of frames of image information that are presented per second of streaming video and the like. The presentation content is stored in internal memory 42 and used whenever a user requests that content be for presentation on the display (step 105).

This has two beneficial effects, first, the presentation image content occupies a smaller portion of the memory capacity of internal memory 42 than the acquired image content from which it is formed, and second, the presentation content is readily available for presentation without requiring display device 10 to convert acquired image content into presentation content form each time that the acquired content is to be displayed.

When acquired image content, and/or audio content and presentation content are stored in display device 10, (steps 102 and 104) this content is stored in a structured fashion (step 118). In one embodiment, the content is stored in a simple data directory of the type used in the Disk Operating System or other similar data directories with folders containing files organized by date and time of creation, by file name, or using some other file organization. In another embodiment more complex structures can be used to store data files containing acquired image content, audio content and/or presentation content. For example, data can be stored in internal memory 42 in a fashion that separates acquired image content from presentation content that corresponds to the acquired image content.

In one embodiment, internal memory 42 is partitioned into a portion containing a collection of presentation content that the user wishes to retain in display device 10 to provide a mobile collection of presentation content and into a portion that stores acquired image content, audio content and presentation content that has not yet been archived. In another embodiment, all acquired content is automatically converted into presentation content and the presentation content is stored in a permanent collection in internal memory 42 of display device 10.

Similarly it will be appreciated that audio system 38 can only reproduce audio signals having certain characteristics while audio system 38 can be capable of acquiring audio with a much broader range of characteristics. Where display device 10 obtains image and audio content having, for example, audio signals encoded in a form adapted for presentation using a so-called surround sound system, audio system 38 may not be capable of reproducing such a signal because it lacks a number of speakers or a distribution of speakers that can only be made in a properly equipped environment. Similarly, audio content can be obtained that has a range of frequencies that cannot be reproduced using audio system 38. Accordingly, audio content such as audio content that is associated with the acquired image content can likewise be processed by controller 12 and signal processor 18 to form presentation content having a different form and that can be stored using less of the storage capacity of internal memory 42.

Data structures such as databases, indices and catalogs can be used to structure and store content in internal memory 42 in the form of virtual photo and video albums. Such structures can be indexed based upon the substance of the content, the time and date of the content or other useful arrangements defined by the user of display device 10.

The user of display device 10 operates user interface 14 to determine further actions (step 108). If the user chooses to present content, for example, using display 16 images, the presentation content in the form of image content can be presented (step 110) on display 16 and any associated audio can be presented using audio system 38. Display 16 can display only one image or might display a sequence of still or motion images, according to the user's preferences.

Eventually, the user of display device 10 establishes communication with archival storage device 60 (step 112) and acquired image content and audio content are transferred to the archival storage device 60 where they are stored (step 114). Any presentation image content and/or audio content corresponding to the acquired image content and stored in internal memory 42 of display device 10 will also be transferred to archival storage device 60 (step 114).

While display device 10 and archival storage device 60 are connected, archival storage device 60 can also transfer any presentation image content that is stored in archival storage memory 68, but not stored in internal memory 42, to display device 10 (step 114). In this step, archival system processor 66 can determine whether a user of archival storage device 60 has made changes to any archival content stored on archival storage memory 68. Where such changes are found, archival system processor 66 can form presentation content that corresponds to this edited archival content and can substitute the newly formed presentation content for the old presentation content associated with an unedited form of the archival content and stored on display device 10. In this way, display device 10 maintains a catalog of presentation content that corresponds to the current version of acquired content stored in archival storage memory 68. Archival storage device 60 can also update any organizational changes that have been made in the way in which archival storage device 60 stores acquired content but not in display device 10 (step 116). In this way, display device 10 organizes presentation content in a way that reflects the organization of content in archival storage device 60.

As is shown in FIG. 2, archival storage device 60 also acquires image content from a second display device 74. Where this occurs, image and/or audio content within archival storage device 60 can be divided into groups, with each group associated with one of display device 10 and display device 70 so that one archival storage device 60, for example, can support independent users having separate display devices 10 and 74 while maintaining the content in the archival storage device private for each user. Alternatively, all content may be accessible to both display devices 10 and 74, so that, in effect, each display device has a separate copy of the archive. It is also possible that some of the digital image groups can be accessible to more than one display device and other groups to be accessible to only one, or to none. In this way, controlled sharing of content among multiple users of archival storage device 60 can be provided.

It will be appreciated that archival storage device 60 can discriminate between individual display devices such as between display device 10 and second display device 74 based upon, for example, identifiers such as a device identification signal or user identification signal that can be transmitted from display device 10 and second display device 74 to archival storage device 60. This allows archival storage device 60 to select content to be received or transmitted to a display device with which archival storage device 60 has established a communications link. For example, as noted above, image content can be transferred to display device 10 and second display device 74 from selected ones of groups of image content stored in archival imaging device 60. Similarly, archival storage device 60 can, itself, have an identifier that is used by display device 10 and second display device 74 to determine the nature of the interaction between display device 10, second display device 74 and archival storage device 60. For example, as noted above, in the embodiment of FIG. 3, archival storage device 60 transmits a signal to display device 10 indicating that archival images are to be deleted, and, in the embodiment shown, display device 10 automatically deletes the archival images in response to this signal. However, second display device 74 can be adapted to perform this automatic deletion in response to the signal only when the signal is generated by an archival storage device 60 having a particular identifier. In this way, display device 10 can upload acquired image content to a non-preferred archival storage device (not shown) without risk that the acquired image content will be automatically deleted before the acquired content is uploaded to a preferred archival storage device 60.

In one alternative embodiment, the step of converting acquired image content and/or audio content (step 104) is performed by display device 10 only where display device 10 is called upon to present the content prior to establishing communication between display device 10 and archival storage device 60. In this way, the battery capacity and memory capacity of display device 10 can be conserved in situations where it is not necessary to present the image and/or audio content before display device 10 communicates with archival storage device 60. Where this is done, archival storage device 60 can automatically detect any acquired content that is not associated with presentation content, can form the presentation content, and can transmit this presentation content to display device 10.

In another alternative embodiment, an additional step of deleting stored presentation content can be performed automatically by display device 10. This can occur where a user wishes to store additional acquired content and there is insufficient memory to store the additional acquired content in addition to the currently stored acquired content and presentation content. When this situation occurs, a portion of the presentation content can be deleted to make additional memory capacity available.

Similarly, the step of storing presentation content (step 105) can be omitted where controller 12 of display device 10 determines that the presentation content corresponding to acquired content cannot be stored in the memory available in imaging device 10.

In still another embodiment, display device 10 and archival storage device 60 can be adapted so that presentation content is automatically preserved in of display device 10 only where the presentation content corresponds to acquired content that the user of display device 10 has asked to be presented before the display device 10 is connected to archival storage device 60. This helps to conserve on the amount of memory capacity used to store presentation content by limiting the content stored in display device 10 to that content that the user has indicated an interest in by causing it to be presented by display device 10 between the time that display device 10 acquires the content and the time that a communication link is established between display device 10 and archival storage device 60.

It will be appreciated that in certain situations display device 10 can act as an archival storage device for another display device. For example, display device 10 can be operable in a mode wherein display device 10 receives acquisition content from display device 74 and transmits a signal that causes display device 74 to discard the acquired content while also causing presentation content corresponding to the content discarded by display device 74 to be retained in display device 74.

Figure 4:
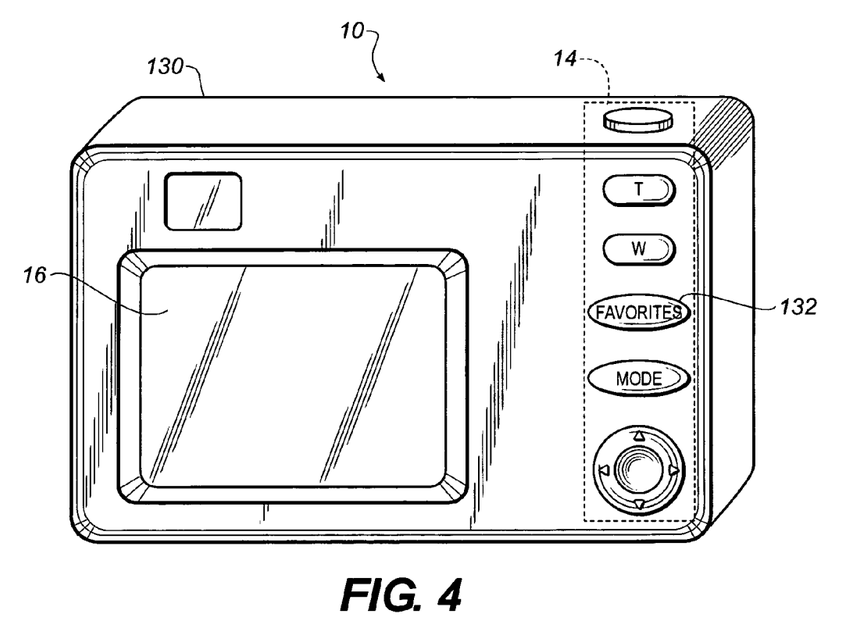
FIG. 4 shows a back view of an embodiment of a display device.
Figure 5:
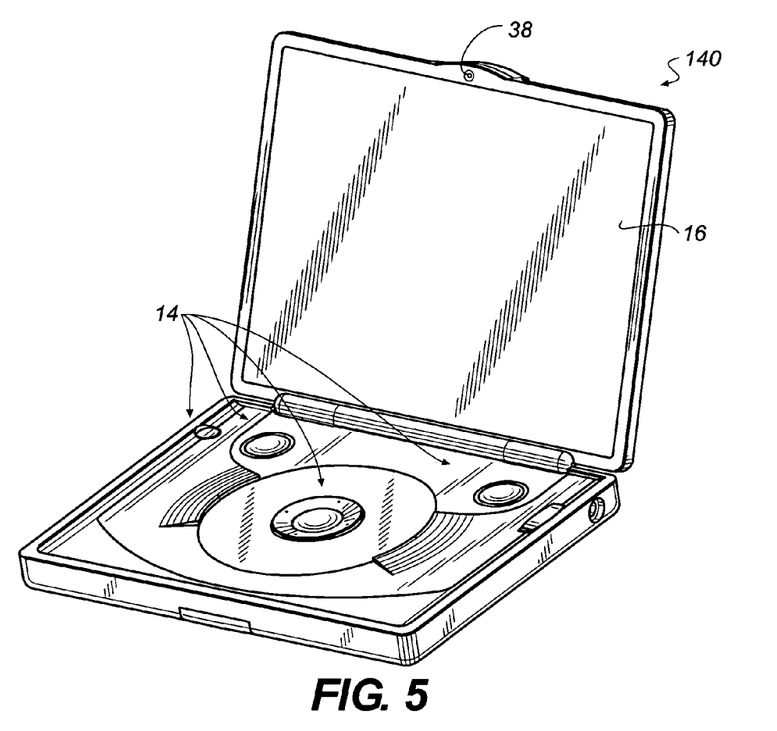
FIG. 5 shows a perspective view of an embodiment of a display device in the form of a multi-media display device.
Figure 6:
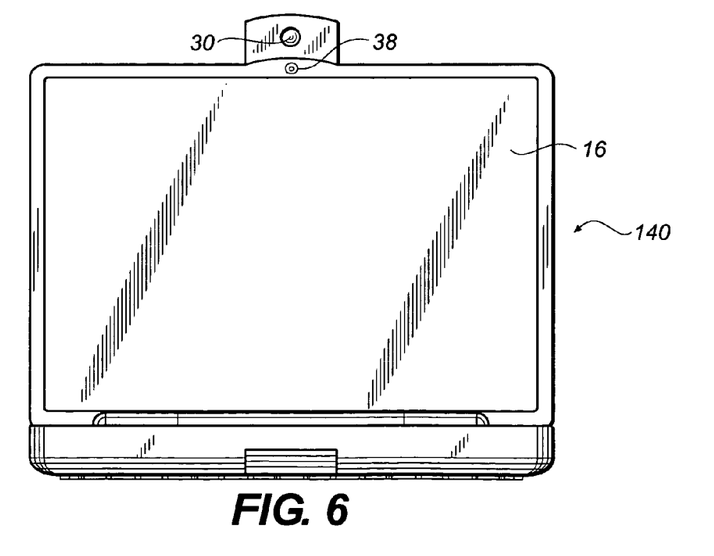
FIG. 6 shows a front view of a display device in the form of a multi-media display device.

Display device 10 can take many forms and can be incorporated in various conventional devices. For example, display device 10 can take the form of a digital camera 130, one embodiment of which is shown in FIG. 4, and a multi-media device 140 shown in FIGS. 5 and 6. Other examples of forms of display device 10 include, but are note limited to, a personal digital assistant, a cellular telephone, a television, and/or other devices.

In a further embodiment of the invention, controller 12 stores data indicating the number of times that a user of display device 10 uses user interface 14 to request that particular content be presented using display device 10. This information can be used as an indication of the user's interest in the content. The number of request data can be stored in association with the acquired content and/or display content as metadata and can also be stored separately. The number of request data can also be transferred with acquired content and/or display content to archival storage device 60 which can also maintain a record of number of request data and this record can be updated each time display device 10 establishes communication with archival storage device 60.

Similarly, the number of times that acquired content and/or display content stored on archival storage device 60 is presented can be recorded by archival system processor 66 and included in the number of request data.

The number of request data can be associated with time of request information. This provides a way to discriminate between content that was of high interest at one time but that has not recently been of interest. There are a variety of ways in which this can be done. In one embodiment, this is done by controller 12 recording date and/or time information in association with the number of request data. In such an embodiment the number of request data can comprise a file that contains dates and times with each separate date and time entry being regarded as a separate request for the purposes of determining the number of requests. Alternatively, controller 12 can simply increment a number of requests counter that is associated with display content stored on display device 10. When this counter information is transferred to archival storage device 60, archival storage device 60 detects changes in the counter information for the content and records date and/or time data indicating the number of time that the content has been presented since the last time that the same content was uploaded. This provides a less precise but still useful indication of the level of continuing interest in selected content.

The number of request data and/or time data associated with the number of request data can be used for a variety of purposes. For example, controller 12 can assemble a relatively short list of favorite content based upon the number of request data. For example, the favorites list can contain a set of content that has the highest number of requests, or the highest number of requests within the past few days, weeks or months. Display device 10 makes such content easily accessible to the user of display device 10. In this example user interface 14 can provide a favorites button 132 as shown in FIG. 4 that causes the camera embodiment 130 to call up a list of favorite contents from which the user can quickly select content for presentation.

The number of request data and/or time data associated with the number of request data can also be used to select display content for removal from display device 10 in circumstances where the portion of internal memory 42 of display device 10 that is used by display content is filled, yet the user evidences a desire to continue to acquire content using display device 10. In this situation display content that has few requests or for which no recent requests for presentation have been made can be removed from internal memory 42.

The invention has been described in detail with particular reference to certain preferred embodiments thereof, but it will be understood that variations and modifications can be effected within the spirit and scope of the invention.

PARTS LIST 10 display device
12 controller
14 user interface
16 display
18 signal processor
20 source of content
22 image capture system
24 communication interface
26 memory interface
28 other displays
30 lens system
32 image sensing system
38 audio system
42 internal memory
44 memory interface
46 memory card
48 imaging system
50 digital camera
52 handheld computer
54 personal computer
56 communication network
60 archival storage device
62 communication system
64 docking station
66 archival system processor
68 archival storage memory 70 display
72 user interface
74 second display device
100 acquire image content step
102 transfer image content step
104 convert acquired image content into presentation content
106 store content step
108 user decision step
110 present presentation content step
112 establish communication step
114 transfer content step
116 remove acquired content step
118 update storage structure step
130 camera
132 "favorites" button
140 multi-media device

What is claimed is:

1. A digital display device comprising:
a communication interface adapted to communicate with an external archival storage device;
a content source adapted to acquire content in an acquisition resolution from an external device;
a presentation system for presenting content at a presentation resolution that is lower than acquisition resolution;
a memory for storing content;
a controller adapted to receive acquired content at from the content source, to form presentation content that corresponds to the acquired content said presentation content and that is adapted to have the second resolution for presentation using the presentation system and to cause the acquired content and the corresponding presentation content to be stored in the memory; and
wherein the controller is further adapted to cause the communication interface to transfer acquired content to the external archival storage device and to delete the transferred acquired content from the memory while retaining the presentation content in the memory for later presentation.

2. The digital display device of claim 1, wherein the content source is an image capture system.

3. The digital display device of claim 1, wherein the archival storage device is a home computer.

4. The digital display device of claim 1, wherein the archival storage device is an Internet-accessible on-line storage system.

5. The digital display device of claim 1, wherein the acquired content comprises at least one still image.

6. The digital display device of claim 1, wherein the acquired content comprises at least one of a digital still image, an image sequence, graphics, text, audio content and a stream of image information.

7. The digital display device of claim 1, wherein the communication interface uses a memory storage device.

8. The digital display device of claim 1, wherein the communication interface uses a wireless connection.

9. The digital display device of claim 1, wherein the communication interface uses a wired connection.

10. The digital display device of claim 1, wherein the archival storage device has a communication system to acquire content from sources different from the digital display device.

11. The digital display device of claim 1, wherein the archival storage device has a processor adapted to perform at least one of the functions of editing, deleting, and organizing content and a memory to store content.

12. The digital display device of claim 1, wherein the display device displays the presentation content using an organization structure provided by the archival storage device, so that the digital display device organizes presentation content in a way that reflects the organization of acquired content to the transferred archival storage device.

13. The digital display device of claim 1, wherein the total storage available in the display device is dynamically divided between the acquisition content and presentation content images depending on the use of the display device.

14. The digital display device of claim 1, further comprising an audio system for acquiring content containing audio information and for presenting audible signals representing audio information contained in acquired content.

15. The digital display device of claim 1 wherein the display comprises an OLED display.

16. The digital display device of claim 1 wherein the controller is adapted to prevent the storage of more than one copy of the same content.

17. The digital display device of claim 1 further comprising an audio system adapted to generate audio content associated with or incorporated within the image content.

* * * * *